United States Patent [19]

Hagquist et al.

[11] Patent Number: 5,444,108
[45] Date of Patent: Aug. 22, 1995

[54] MECHANICALLY PEELABLE MASKING COATING COMPOSITION

[75] Inventors: James A. E. Hagquist, St. Paul; Lawrence L. Micek, Woodbury, both of Minn.

[73] Assignee: H. B. Fuller Licensing & Financing, Inc., Arden Hills, Minn.

[21] Appl. No.: 225,133

[22] Filed: Apr. 8, 1994

[51] Int. Cl.$^6$ .................. C08L 27/06; C08K 5/12
[52] U.S. Cl. .................. 523/455; 524/299; 524/295
[58] Field of Search .......................... 523/455

[56] References Cited

U.S. PATENT DOCUMENTS

| 3,864,101 | 2/1975 | Charvat | 51/298 |
| 3,868,341 | 2/1975 | Sauer | 523/455 |
| 4,562,025 | 12/1985 | Gray . | |
| 4,634,607 | 1/1987 | Ernsberger . | |
| 4,673,710 | 6/1987 | Burba | 523/455 |
| 4,765,483 | 8/1988 | Ernsberger . | |
| 4,826,705 | 5/1989 | Drain et al. . | |
| 4,959,399 | 9/1990 | Nuynh-Tran | 523/455 |
| 4,977,201 | 12/1990 | Ogawa | 523/400 |

FOREIGN PATENT DOCUMENTS

| 859399 | 8/1981 | U.S.S.R. | 523/455 |
| 1147726 | 3/1985 | U.S.S.R. | 523/455 |

OTHER PUBLICATIONS

Product Information Material Safety Data From Monsanto, *Monsanto Product Name Santicizer®261 Plasticizer*, pp. 1–3.
Product Information From Monsanto, *Monomeric Plasticizer Offering Permanence That Approximates Polymerics', Santicizer 261*, allkyl benzyl phthalate, 5 pages.
Abstract of U.S. Pat. No. 5,085,908, *Lightsafe Masking Film*, to Maruyama Hiroshi et al.
Abstract of U.S. Pat. No. 5,085,697 *Method of Forming a Tentative Surface Protective Coating, Applying Photosensitive Ink on Substrate; Curing*, to Fujii Toshihiro et al.
Abstract of U.S. Pat. No. 5,043,198 *Lightsafe Masking Film; Including a Binder, Solids, Fillers, and Polysiloxane*, to Kiryu Naohiko et al.
Abstract of U.S. Pat. No. 5,035,981 *Multilayer, Sheet-Like, Photosensitive Recording Material; Having a Top Layer of High–Strength, Transparent, Soluble or Swellable Polymer Containing an Antistatic Agent of an Ethoxylated Amine or Amide; Exposure; Development*, to Helmut Bach et al.
Abstract of U.S. Pat. No. 5,013,088 *Disintegratable Masking Label*, to Thomas C. Marin.
Abstract of U.S. Pat. No. 5,009,944 *Lightsafe Masking Film; Containing Dialkyl Phthalate, Nitrocellulose, and Colorant*, to Kiryu Naohiko et al.
Abstract of U.S. Pat. No. 4,946,711 *Masking Compositions and Method for Applying the Same; Peelable Mask Resistant to Strong Acid and Strong Base Etchants*, to Robert W. Byrd et al.
Abstract of U.S. Pat. No. 4,937,116 *Lightsafe Masking Film; Peelable Layer Containing Iron Oxides and Yellow Dyes*, to Kiryu Naohiko et al.
Abstract of U.S. Pat. No. 4,929,469 *Method of Forming a Tentative Surface Protective Coating; Screen Printing, Ultraviolet Curable Rubbery Coating*, to Fujii Toshihiro et al.
Abstract of U.S. Pat. No. 4,928,588 *Apparatus for Dry Printing onto a Workpiece Using a Hot Embossing Film and an Embossing Die*, to Walter Mathis.

(List continued on next page.)

Primary Examiner—John C. Bleutge
Assistant Examiner—D. R. Wilson
Attorney, Agent, or Firm—Vidas, Arrett & Steinkraus

[57] ABSTRACT

A mechanically peelable masking coating composition particularly useful for metals, and the method of preparing same for use is provided. The composition is heat curable in one or two heatings to produce a firmly adhering yet peelable coating. In its preferred form the composition comprises a mixture of a dispersion grade vinyl, a plasticizer, an adhesion promoter such as an epoxy, and optionally a thixotrope where greater resistance to sag and flow are desired. No fugitive solvents are required.

6 Claims, No Drawings

MECHANICALLY PEELABLE MASKING COATING COMPOSITION

BACKGROUND OF THE INVENTION

The invention is directed to a composition and the method of its preparation for use in temporarily masking surfaces where protection is desired a) from marring during later steps of manufacture (b) for chemically selectively etching portion(s) of a surface while shielding the balance and (c) for selectively exposing portion(s) of a surface to spray painting or the like while keeping other areas from being painted. Specifically, it provides a strippable coating which becomes tack free at about 150° F. in about 10 minutes and is fully strippable after about 20 minutes at about 350° F.

The composition and its use provides: masking that does not involve noxious solvents either in application or removal, masking that is simply curable by heating in one or two steps and masking that is capable of a high degree of definition for precision work.

Many techniques and compositions have been developed in the past for selectively masking a work surface for defining areas to be chemically etched, painted or otherwise treated. Masking tape is well known for this purpose as is solvent borne rubber. Most of the prior techniques and compositions utilize solvents to carry the masking material prior to coating the work surface and subsequently require solvents to remove the masking layer from the work surface after the use of the masking has been accomplished. Another common masking procedure involves radiation curable coatings that can be selectively cured using photographic procedures. One such procedure that produces a coating that can be mechanically stripped is described in U.S. Pat. No. 4,826,705 to Drain et al. While such prior techniques are usable they have disadvantages such as the recurring use of large amounts of solvents, both to apply and to remove the coating and complex curing procedures such as that of Drain et al.

SUMMARY OF THE INVENTION

The invention comprises a gel-like composition that may be readily applied to a surface and then cured through two-stage heating at 1) a relatively low temperature of approximately 150° F. to gel and adhere the composition firmly to the substrate and subsequently 2) all a temperature of about 350° F. for twenty minutes to give a product of sufficient strength to be peeled after the masking purpose has been achieved. During the second stage of heating the bonding adherence is lowered facilitating easier removable. The first heating may be by-passed and a full cure made in a single heating step at 350° F. In this instance the bond strength and resultant definition ability of the mask may be less than in the case of two separate heating steps.

The composition is useful as a mask for etching, painting, plating and other applications of that type.

DETAILED DESCRIPTION OF THE INVENTION

The advantage of this composition is that it lowers the solvent use and eliminates manual labor. The composition is applied by roll coating or spraying the material and gelling and fusing it under specified conditions. Due to its thixotropic flow properties it readily remains in place when applied. This material is removed by stripping it off of the surface.

The unexpected results displayed by this composition are that this modified plasticol has properties to bond to most surfaces. When it goes through the gellation and fusion process, it has enough strength to be stripped from the surface like a tape. The adhesion characteristics can be readily varied by adding different amounts of epoxy and plasticisers so that the plasticiser can migrate to the interface and produce a strippable film.

Basic ingredients are: Dispersion grade vinyl, a plasticiser that will migrate to the surface, an epoxy to promote adhesion and cab-o-sil that will control sag resistance, flow and allow for definition.

A preferred formulation includes a dispersion grade poly(vinyl chloride) such as that sold under the trademark Formolon NV-2 available from Formosa Plastics Corporation Delaware of Delaware City, Del. This is blended with a plasticizer such as alkyl benzyl phthalate having a molecular weight of about 368 which is available under the trademark Santicizer 261 from Monsanto Industrial Chemicals Co., St. Louis, Mo. The plasticizer and vinyl are used in approximately equal parts be weight in the preferred formulation. Where superior adhesion is required or desired a bonding agent such as epoxy or soybean oil is useful in an amount of about 2.5% by weight. Should it be desired to have greater resistance to sag or flow a thixotrope such as fumed silica (Cab-o-sil from Cabot Corporation of Tuscola, Ill.) is useful in an amount ,up to about 2% by weight.

EXAMPLE

A preferred formulation of the invention and the method of its formulating is described in the following Example:

47.75 by weight parts of Santicizer 261 plasticizer is mixed with 2.5 parts by weight of a low molecular weight epoxy resin. The epoxy may be EPON ® Resin 828 available from Shell Chemical Company of Chicago, Ill. It is an epichlorohydrin/bisphenol A low molecular weight epoxy resin with an epoxide equivalent of 175-210.

The above is mixed under agitation with 47.75 parts by weight of a dispersion grade poly (vinyl chloride) (PVC) such as the previously noted Formolon NV-2 keeping the temperature below 100° F. to prevent gelling. The mixture is placed under a low pressure for a time sufficient to remove any bubbles. Fumed silica in an amount of 2.0 parts by weight is added, mixed and again evacuated until bubbling ceases. This formulation is very stable as long as it is maintained below 100° F.

In use the mixture may be applied by known techniques such as roll coating to the surface areas to be masked and then heated to 150° F. to gel. A strongly adherent coating results. After the use of the mask for its intended purpose, the temperature is raised to about 350° F. for approximately 20 minutes. During the heating it is believed that the plasticizer migrates to the surface weakening the bond between the coating and substrate while simultaneously toughening the coating so it can be mechanically peeled from the substrate.

The proportions of plasticizer and PVC may be varied over a range of about 3 to 1 parts of PVC to about 3 to 0.5 parts plasticizer. Properties of the cured mask will vary in strength and definition to some degree dependent on the ratio of PVC to plasticizer.

Generally less than about 60% plasticizer is desired. The lower limit of PVC is about 30%. Approximately equal amounts are preferred.

The amount of bonding agent such as the aforesaid epoxy may also be varied from none to about 5% by weight. Amounts in excess of 5% by volume have been found to be unnecessary.

The thixotrope can be eliminated but may give very important sag and flow characteristics to the coating that are vastly different for each application.

Multiple coatings can be applied to increase definition and strength. Bonding between the coatings is excellent provided only the gel temperature of 150° F. is used. When a full cure of 350° F. is used subsequent coats do not bond to one another as well.

While this invention may be embodied in many different forms, there are described in detail herein specific preferred embodiments of the invention. This description is an exemplification of the principles of the invention and is not intended to limit the invention to the particular embodiments illustrated.

What is claimed is as follows:

1. A heat curable masking coating that is partly curable at a first elevated temperature and becomes mechanically strippable after heating at a second elevated temperature above said first temperature, the composition consisting essentially of a mixture of:
    a) a dispersion grade of poly(vinyl chloride) in an amount of about 47.75% by weight of said mixture;
    b) a monomeric plasticizer in an amount of about 47.75% of weight of said mixture, the plasticizer capable of migrating to the surface of said coating;
    c) an epoxy resin of epichlorohydrin/bisphenol A with an epoxide equivalent weight of 175-210 in an amount of about 2% by weight of said mixture, and;
    d) optionally a thixotrope in an amount of about 2.0% by weight of said mixture.

2. A heat curable masking coating that is partly curable at a first elevated temperature and becomes mechanically strippable after heating at a second elevated temperature above said first temperature, the composition consisting essentially of a mixture of:
    a) a dispersion grade poly(vinyl chloride) in an amount of about 47.75% by weight of said mixture;
    b) an epoxy resin of epichlorohydrin/bisphenol A with an epoxide equivalent weight of 175-210 in an amount of about 2.5% by weight of said mixture;
    c) a monomeric plasticizer of alkyl benzyl phthalate in an amount equal to about 47.75% by weight of said mixture, the plasticizer capable of migrating to the surface of said coating; and
    d) a thixotropic composition of fumed silica in an amount of about 2% by weight of said mixture.

3. A masking composition consisting essentially of a mixture of a dispersion grade poly(vinyl chloride) and a plasticizer, in approximately equal amounts, the plasticizer capable of migrating to the surface of the composition, additionally including an epoxy resin of epichlorohydrin/bisphenol A, with an epoxide equivalent weight of 175-210, in a minor amount of about 2.5% or less by weight.

4. The composition of claim 3 wherein the minor amount is about 2% by weight or less.

5. The composition of claim 3 additionally including a thixotrope in a minor amount of about 2.5% by weight or less.

6. The composition of claim 5 wherein the plasticizer comprises an alkyl benzyl phthalate and the thixotrope comprises a turned silica.

* * * * *